(12) United States Patent
Wilson et al.

(10) Patent No.: US 10,823,134 B2
(45) Date of Patent: Nov. 3, 2020

(54) NONLINEAR CONTROLLER FOR NONLINEAR WAVE ENERGY CONVERTERS

(71) Applicants: National Technology & Engineering Solutions of Sandia, LLC, Albuquerque, NM (US); Michigan Technological University, Houghton, MI (US)

(72) Inventors: David G. Wilson, Tijeras, NM (US); Giorgio Bacelli, Albuquerque, NM (US); Rush D. Robinett, III, Tijeras, NM (US); Ossama Abdelkhalik, Houghton, MI (US)

(73) Assignees: National Technology & Engineering Solutions of Sandia, LLC, Albuquerque, NM (US); Michigan Technological University, Houghton, MI (US)

(*) Notice: Subject to any disclaimer, the term of this patent is extended or adjusted under 35 U.S.C. 154(b) by 0 days.

(21) Appl. No.: 16/534,746

(22) Filed: Aug. 7, 2019

(65) Prior Publication Data
US 2020/0088154 A1 Mar. 19, 2020

Related U.S. Application Data

(60) Provisional application No. 62/730,891, filed on Sep. 13, 2018.

(51) Int. Cl.
*F03B 13/14* (2006.01)
(52) U.S. Cl.
CPC ................ *F03B 13/14* (2013.01)

(58) Field of Classification Search
CPC .......... F03B 13/14; F03B 13/20; F03B 15/16; F05B 2260/421
See application file for complete search history.

(56) References Cited

U.S. PATENT DOCUMENTS

| 4,134,023 A * | 1/1979 | Salter ............... F03B 13/181 290/42 |
| 9,140,231 B1 * | 9/2015 | Wilson ............... F03B 13/20 |
| (Continued) | | |

OTHER PUBLICATIONS

Synergistic Design of a Combined Floating Wind Turbine Wave Energy Converter, Jun. 2017, Massachusettes Institute of Technology, Chapter 4.*

(Continued)

*Primary Examiner* — Jesse S Bogue
(74) *Attorney, Agent, or Firm* — Kevin W. Bieg

(57) ABSTRACT

The present invention is directed to a nonlinear controller for nonlinear wave energy converters (WECs). As an example of the invention, a nonlinear dynamic model is developed for a geometrically right-circular cylinder WEC design for the heave-only motion, or a single degree-of-freedom (DOF). The linear stiffness term is replaced by a nonlinear cubic hardening spring term to demonstrate the performance of a nonlinear WEC as compared to an optimized linear WEC. By exploiting the nonlinear physics in the nonlinear controller, equivalent power and energy capture, as well as simplified operational performance is observed for the nonlinear cubic hardening spring controller when compared to an optimized linear controller.

6 Claims, 13 Drawing Sheets

(56) References Cited

U.S. PATENT DOCUMENTS

| | | | | |
|---|---|---|---|---|
| 9,680,414 B1* | 6/2017 | Chen | ............................ | H03G 3/20 |
| 9,966,966 B2* | 5/2018 | Czaplewski | ............ | H03B 5/1215 |
| 10,087,909 B2* | 10/2018 | Sheldon-Coulson | ... | F03B 13/12 |
| 10,415,538 B2* | 9/2019 | Wu | ............................ | F04F 5/466 |
| 10,533,531 B2* | 1/2020 | Vamvas | ..................... | F03B 13/20 |
| 2018/0164754 A1 | 6/2018 | Wilson et al. | | |
| 2019/0010914 A1* | 1/2019 | Grey | ..................... | F03B 13/1845 |

OTHER PUBLICATIONS

Retes, M.P. et al., "A Review of Non-Linear Approaches for Wave Energy Converter Modelling", Proceedings of the 11th European Wave and Tidal Energy Conference 2015, pp. 08C1-3-1-08C1-3-.

Wolgamot, H.A. et al., "Nonlinear Hydrodynamic and Real Fluid Effects on Wave Energy Converters", Proc IMechE Part A: Journal of Power and Engineering, vol. 229 (2015), pp. 772-794.

Giorgi, G. et al., "Nonlinear Hydrodynamic Models for Heaving Buoy Wave Energy Converters", Asian Wave and Tidal Energy Conference 2016, Singapore, 10 pages.

Wilson, D.G. et al., "Order of Magnitude Power Increase from Multi-Resonance Wave Energy Converters", Oceans'17 MTS/IEEE, Sep. 2017, Anchorage, AK, 7 pages.

Hals, J et al., "A Comparison of Selected Strategies for Adaptive Control of Wave Energy Converters", Journal of Offshore Mechanics and Arctic Engineering, vol. 133, 2011, pp. 031101-1-031101-12.

* cited by examiner

NONLINEAR CONTROLLER FOR NONLINEAR WAVE ENERGY CONVERTERS

CROSS-REFERENCE TO RELATED APPLICATION

This application claims the benefit of U.S. Provisional Application No. 62/730,891, filed Sep. 13, 2018, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy converters and, in particular, to a nonlinear controller for nonlinear wave energy converters.

BACKGROUND OF THE INVENTION

Wave energy converters (WECs) extract energy from waves in a body of water, such as the ocean. See J. Falnes, *Ocean Waves and Oscillating Systems*, Cambridge, N.Y., Cambridge University Press, 1st ed. (2002); and J. Hals et al., *J. Offshore Mech. Arct. Eng.* 133(3), 031101 (2011). The wave energy source is spatially, temporally, and energetically variable which translates to a predominant frequency of waves, wave heights, and widths of the wave frequency spectrum. Traditionally, WEC devices generate power over a small band of the full wave frequency spectrum. The WEC is typically designed to resonate at a frequency matching the dominant wave frequency in a specific operational region. Typically, when a wave impacts the WEC device at the resonance frequency, the device can absorb a significant amount of energy from the wave very efficiently. However, when the WEC is off-resonance with the impacting waves the WEC operates much less efficiently. The primary goal of a feedback controller is to improve the efficiency of the energy capture in off-resonance conditions.

To be competitive with other energy market technologies and maximize economic return in the form of energy and electrical power, the WEC must be capable of operation and energy capture over the full range of sea states. The full sea state range will include highly nonlinear sea state conditions during the power production mode. See M. Retes et al., "A Review of Non-Linear Approaches for Wave Energy Converter Modelling," *Proc. of the 11th European Wave and Tidal Energy Conference*, Nantes, France, Sep. 6-11, 2015. A large reduction in buoy sizes and improvements in year around power capture through multi-resonance will be required to make the location deployments independent. By focusing on multi-resonance, a large increase in power will show both a reduction in size and weight making the new WEC designs more efficient. There are multiple sources of possible nonlinearities in the WEC dynamic model. See A. Wolgamot and C. Fitzgerald, *Proc. IMechE, Part A: J. Power and Energy* 229(7), 772 (2015). For example, if the buoy shape is not perpendicular near the water surface then the hydrostatic force is nonlinear. The hydrodynamic forces can also be nonlinear in the case of large motion. See G. Giorgi et al., "Nonlinear Hydrodynamic Models for Heaving Buoy Wave Energy Converters," *Asian Wave and Tidal Energy Conference (AWETEC* 2016), Marina Bay Sands, Singapore, 2016. Control strategies that aim at maximizing the harvested energy will increase the motion amplitude and hence amplify these nonlinearities.

SUMMARY OF THE INVENTION

The present invention is directed to a nonlinear controller for nonlinear WECs. The nonlinear WEC comprises a buoy in a body of water having a wave motion, wherein the waves impacting the buoy exert an excitation force with a plurality of excitation frequencies that causes a buoy motion in a heave direction relative to a reference, an actuator that is configured to apply a control force in the heave direction to the buoy, and a nonlinear feedback controller that computes the control force to be applied by the actuator, wherein the controller comprises a feedback loop comprising a nonlinear cubic spring.

For comparison, dynamic models were developed for a geometrically right-circular cylinder WEC design for the heave only motion (i.e., single degree-of-freedom (DOF)) for both a conventional linear proportional-derivative complex conjugate controller (PDC3) and the nonlinear (NL) controller comprising a nonlinear cubic spring of the present invention. The C3 algorithm realization targeted both amplitude and phase through PD feedback and was developed from individual frequency components. For the NL controller, the linear stiffness term is replaced by a nonlinear cubic hardening spring term. A comparison of PDC3 controller with the NL controller resulted in equivalent power/energy capture and improvements in reactive power requirements. Importantly, the NL controller provides simplified operational performance when compared to the linear PDC3 controller.

BRIEF DESCRIPTION OF THE DRAWINGS

The detailed description will refer to the following drawings, wherein like elements are referred to by like numbers.

FIG. 5($b$) is a graph of the control force for a linear PDC3 controller and a nonlinear cubic spring controller with single frequency wave excitation.

FIG. 6($b$) is a graph of buoy velocity for both controllers with single frequency wave excitation.

FIG. 7($b$) is a graph of reactive power for both controllers with single frequency wave excitation.

FIG. 9($b$) is a graph of the control force for a linear PDC3 controller and a nonlinear cubic spring controller with multi-frequency wave excitation.

DETAILED DESCRIPTION OF THE INVENTION

Figure 1:
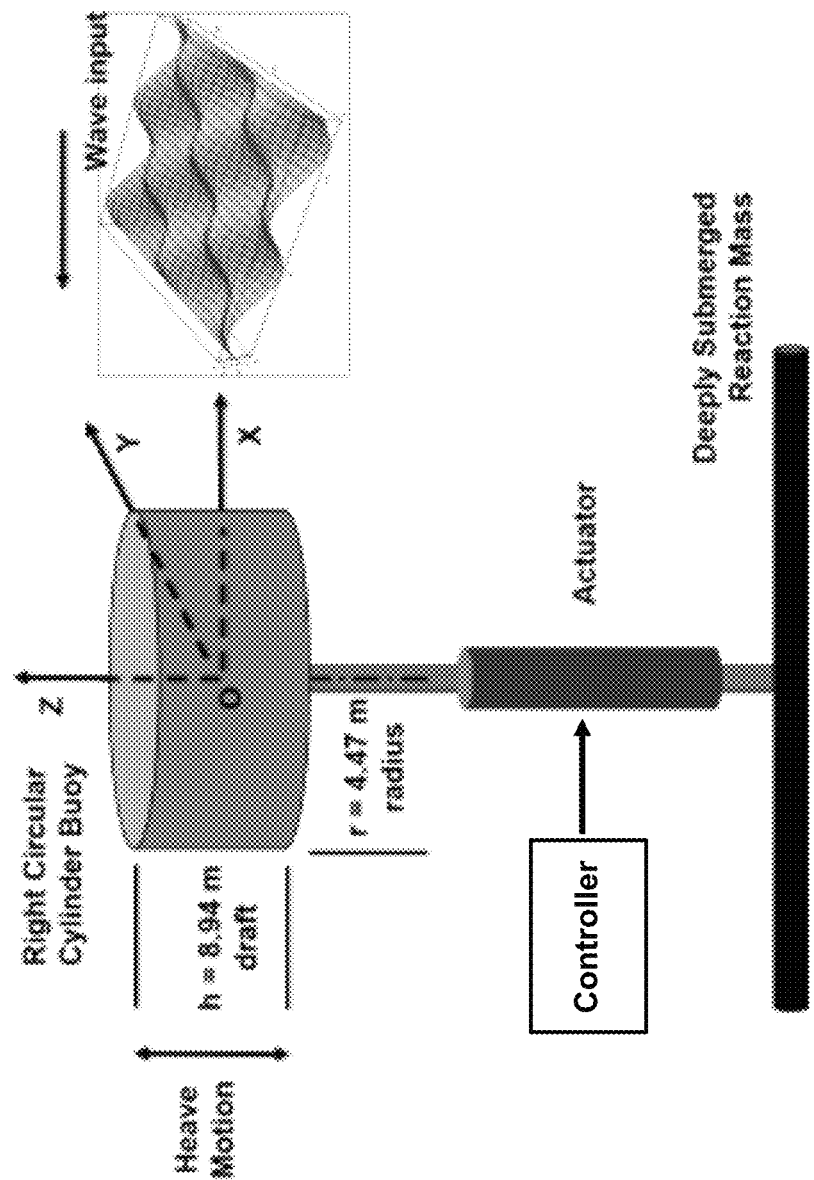
FIG. 1 is a schematic illustration of a wave energy converter comprising a right circular cylinder buoy.

A simplified WEC is shown in FIG. 1. The WEC includes a buoy that is mechanically coupled to a reference, in this example a deeply submerged reaction mass. As shown, the reaction mass can remain essentially stationary as the buoy moves. In this simplified WEC, the buoy is a right circular cylinder that can move up and down along a vertical z axis in a heaving motion in phase with a wave input (a real buoy would generally move with three degrees-of-freedom, further including an up/down rotation about a center-of-gravity in a pitching motion, and back-and-forth, side-to-side displacement in a surging motion). A power take-off (PTO) can be configured to convert the buoy motion to electrical energy, which can then be output by way of a transmission line (not shown). An actuator can couple the buoy and the reaction mass. As indicated above, the WEC can be structurally designed to have a resonant frequency within a predominant spectral range of the excitation wave input. Accordingly, when waves corresponding to the resonant frequency of the WEC impact the WEC, relatively large amplitude motion is created between the buoy and the reference, wherein such motion is translated by the PTO into electrical energy. Conventional WECs, however, tend to be relatively inefficient when wave inputs do not correspond to the resonant frequency of the WEC. Further, the behavior of real sea waves is inherently nonlinear. To that end, the WEC can include a controller that is configured to control operation of the actuator. The controller outputs control signals that are received by the actuator. For example, the controller can utilize reactive control techniques, whereby the controller can cause the actuator (e.g., a motor) to affect the displacement between the buoy and the reference and keep the velocity of the buoy in phase with the excitation wave force. By controlling the spring coefficient and the damping coefficient, the actuator force can be tuned, resulting in a modification of the phase and amplitude of the WEC's motion, as well as the power extracted from the waves. In general, the controller can control the actuator to cause the WEC to remain on resonance when off-resonance waves impact the buoy, thereby causing the PTO to generate larger amounts of electrical energy over time when compared to conventional WECs.

Complex conjugate control (C3) is a commonly employed reactive control strategy. A practical implementation of C3 is referred to as proportional-derivative complex conjugate control (PDC3). It's realization in the time-domain targets both amplitude and phase through feedback that is constructed from individual frequency components that come from the spectral decomposition of the measurements signal. The present invention is directed to a nonlinear control design that employs a nonlinear (NL) cubic hardening spring. The NL cubic spring stiffness controller of the invention results in equivalent power/energy capture and improvements in reactive power requirements compared to the linear PDC3 controller.

A general WEC model is first described below. Next, a design is developed for both the linear PDC3 controller and the nonlinear cubic spring stiffness controller. Finally, numerical simulations are described that compare the feedback control designs.

General WEC Model

An approximate hydrodynamic model for the WEC is assumed. For a heaving buoy the Cummins' equation of motion is given as))

$$(m + \tilde{a}(\infty))\ddot{z} + \int_0^\infty h_r(\tau)\dot{z}(t-\tau)d\tau + kz = F_{ex} + F_u \quad (1)$$

where m is the buoy mass, $\tilde{a}(\infty)$ is the added mass at infinite frequency, z is the heave position of the buoy's center-of-mass with respect to the mean water level, k is the hydrostatic stiffness due to the difference of the gravitational and buoyancy effects, $F_{ex}$ is the excitation force, $F_u$ is the control force, and $h_r$ is the radiation impulse response function. See W. Cummins, "The Impulse Response Function and Ship Motions," *Report* (*David W. Taylor Model Basin*), Navy Department, David Taylor Model Basin. With a state-space approximation for the convolution term in Eq. (1), the whole model can be rewritten as $$\begin{Bmatrix} \dot{z} \\ \ddot{z} \\ \dot{x}_{r1} \\ \dot{x}_{r2} \end{Bmatrix} = \begin{bmatrix} 0 & 1 & 0 & 0 \\ -k/M & 0 & -C_{r_1}/M & -C_{r_2}/M \\ 0 & B_{r_1} & A_{r_{11}} & A_{r_{12}} \\ 0 & B_{r_2} & A_{r_{21}} & A_{r_{22}} \end{bmatrix} + \begin{bmatrix} 0 \\ 1/M \\ 0 \\ 0 \end{bmatrix}(F_{ex} + F_u) \quad (2)$$

with a model of order two selected. The total model consists of four first-order ordinary differential equations. The equivalent mass is given as $M = m + \tilde{a}(\infty)$ with the state-space realization parameters listed in Table 1.

In the numerical simulations described below, a right circular cylinder buoy was selected with the cylinder radius r=4.47 m and a draft set at h=8.94 m (as shown in FIG. 1). The buoy effective mass is $m = 1.76 \times 10^5$ kg and the linear stiffness coefficient is $k = 4.544915 \times 10^5$ kg/s². The damping coefficients utilized during the control studies were in the ranges of $[3.8 – 3.9895] \times 10^5$ kg/s. The nonlinear stiffness coefficient used was $K_{NL} = 1.41 \times 10^4$ N/m³.

TABLE 1

| Radiation Damping Force Parameters | |
|---|---|
| Matrix | Values |
| $A_r$ | $\begin{bmatrix} -0.97656 & -0.98111 \\ 1 & 0 \end{bmatrix}$ |
| $B_r$ | $\begin{bmatrix} 128 \\ 0 \end{bmatrix}$ |
| $C_r$ | $[216.07323 \quad 0]$ |

Control Designs

The two separate control designs are described below for comparison. The first control design is based on a linear PDC3 controller. The second control design of the present invention is based on a nonlinear spring effect. See D. Wilson et al., "Order of Magnitude Power Increase from Multi-Resonance Wave Energy Converters," *Oceans'17 MTS/IEEE*, Anchorage, Ak., September 2017; U.S. Pub. No. 2018/0164754, published Jun. 14, 2018; and R. Robinett and D. Wilson, *Nonlinear Power Flow Control Design: Utilizing Exergy, Entropy, Static and Dynamic Stability, and Lyapunov Analysis*, Springer Verlag London Limited, 2011.

Linear PDC3 Controller

A simple case can be defined for a regular wave where the excitation force has only one frequency, $\omega_1$, and it can be shown that the radiation term can be quantified using an added mass and a radiation damping term, each being considered constant at frequency $\omega_1$ only. See J. N. Newman, *Marine Hydrodynamics*, The MIT Press, 1977. The equation of motion for this simple case is $$(\tilde{m}+\tilde{a}_1)\ddot{z}_1 + c_1\dot{z}_1 + kz_1 = f_{ex1} + f_{u1} \tag{3}$$

where $\tilde{a}_1$ and $c_1$ are constants for a given excitation frequency. See J. Song et al., *Ocean Eng.* 127, 269 (2016). The excitation force becomes $$f_{ex1} = F_{ex1} \sin(\omega_1 t + \phi_1). \tag{4}$$

The WEC is modeled as a linear actuator able to convert heave oscillations of a cylindrical buoy relative to a reaction mass that is submerged deep enough for its oscillations to be negligible in wave conditions of interest to power conversion.

Next the WEC is approximated as a simple mass-spring-damper with a sum of multiple frequency content input excitation forces and the control force as $$m\ddot{z} + c\dot{z} + kz = \sum_{j=1}^{N} F_{ex_j}\sin\Omega_j t + F_u. \tag{5}$$

See D. Wilson et al., "Order of Magnitude Power Increase from Multi-Resonance Wave Energy Converters," *Oceans'17 MTS/IEEE*, Anchorage, Ak., September 2017. The time-domain model is transformed into the equivalent transfer function/block diagram model and is given as $$[ms^2 + cs + k]Z(s) = \sum_{j=1}^{N} F_{ex_j}(s) + \sum_{j=1}^{N} F_{u_j}(s). \tag{6}$$

Now, focusing on the excitation forces only then $$Z(s) = G(z)F_{EX}(s) = G(s)\sum_{j=1}^{N} F_{ex_j}(s) \tag{7}$$

and the transfer function becomes $$G(s) = \frac{1}{ms^2 + cs + k}. \tag{8}$$

Figure 2:
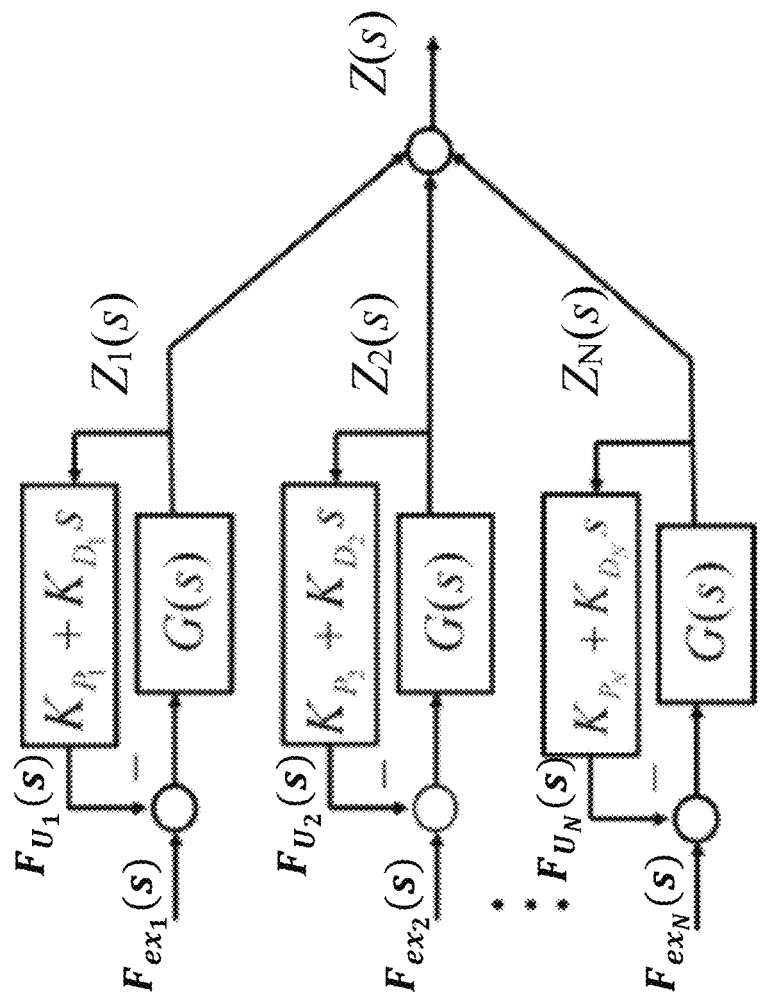
FIG. 2 is a block diagram of a PDC3 controller with additional PD feedback loops.

The final step introduces a PD feedback control for each individual channel, as shown in FIG. 2.

The resulting PD version C3 dynamic model for each individual channel becomes $$m\ddot{z}_j + (c + K_{Dj})\dot{z}_j + (k + K_{Pj})z = F_{exj}\sin\Omega_j t. \tag{9}$$

The PDC3 design starts for a single frequency forcing function as $$m\ddot{z} + c\dot{z} + kz = F_u + F_0 \sin \Omega t. \tag{10}$$

First select the PD feedback control force as $$F_u = -K_P z - K_D \dot{z} \tag{11}$$

where $K_P$ is the proportional feedback gain and $K_D$ is the derivative feedback gain. Substituting Eq. (11) into Eq. (10) results in $$m\ddot{z} + (c + K_D)\dot{z} + (k + K_P)z = F_0\sin\Omega t \tag{12}$$

with $$\omega_n^2 = \frac{(k + K_P)}{m}. \tag{13}$$

The final step is to resonate the PD version of C3 by adjusting the stiffness term, as opposed to canceling the mass and stiffness terms of a traditional C3 implementation. See J. Falnes, *Ocean Waves and Oscillating Systems*, Cambridge, N.Y.: Cambridge University Press, 1st ed. (2002); and J. Hals et al., *J. Offshore Mech. Arct. Eng.* 133(3), 031101 (2011). This particular implementation actually realizes a C3 system by resonating the various frequency content with respect to the input driving frequency. The design steps are 1. Pick $K_D = c$ or $(c+K_D) = 2c = 2R$,
2. Pick $K_P$ such that $\omega_n^2 = \Omega^2 = (k+K_P)/m$ or $K_P = m\Omega^2 - k$,
3. Implement by measuring $c$ and $\Omega$ to compute $K_P$, with $\dot{z}_{opt} = F_0 \sin \Omega t / 2c$ For a multiple frequency forcing function (as applied to irregular waves) the model becomes $$m\ddot{z} + c\dot{z} + kz = F_u + \sum_{j=1}^{N} F_{ex_j}\sin\Omega_j t \text{ (Fourier series)}. \tag{14}$$

See D. Wilson et al., "Order of Magnitude Power Increase from Multi-Resonance Wave Energy Converters," *Oceans'17 MTS/IEEE*, Anchorage, Ak., September 2017. Next, pick the PD controller as $$F_u = \sum_{j=1}^{N} F_{u_j} = \sum_{j=1}^{N} \left[-K_{P_j}z_j - K_{D_j}\dot{z}_j\right] \tag{15}$$

and substituting into Eq. (14) gives $$m\ddot{z}_j + (c + K_{D_j})\dot{z}_j + (k + K_{P_j})z_j = F_{ex_j}\sin\Omega_j t \tag{16}$$

with $$\omega_{n_j}^2 = \frac{(k + K_{P_j})}{m}. \tag{17}$$

The final step is to resonate the PD version of the C3 for multi-frequency input. The design steps are:
1. Pick $K_D = c$ or $(c+K_D) = 2c = 2R$,
2. Pick $K_{P_j}$ such that $\omega_{n_j}^2 = \Omega_j^2 = (k+K_{P_j})/m$ or $K_{P_j} = m\Omega_j^2 - k$.

Nonlinear Cubic Spring Controller

The nonlinear cubic spring controller of the present invention focuses on nonlinear oscillations to multiply and/or magnify the energy and power capture from the WEC device. By introducing a cubic spring in the feedback loop a significant increase in power capture results. Specific linear and nonlinear spring parameters can be tuned or optimized for each sea state level to produce a maximum amount of absorbed power. To transition between sea states a table look-up implementation can be realized.

Figure 3:
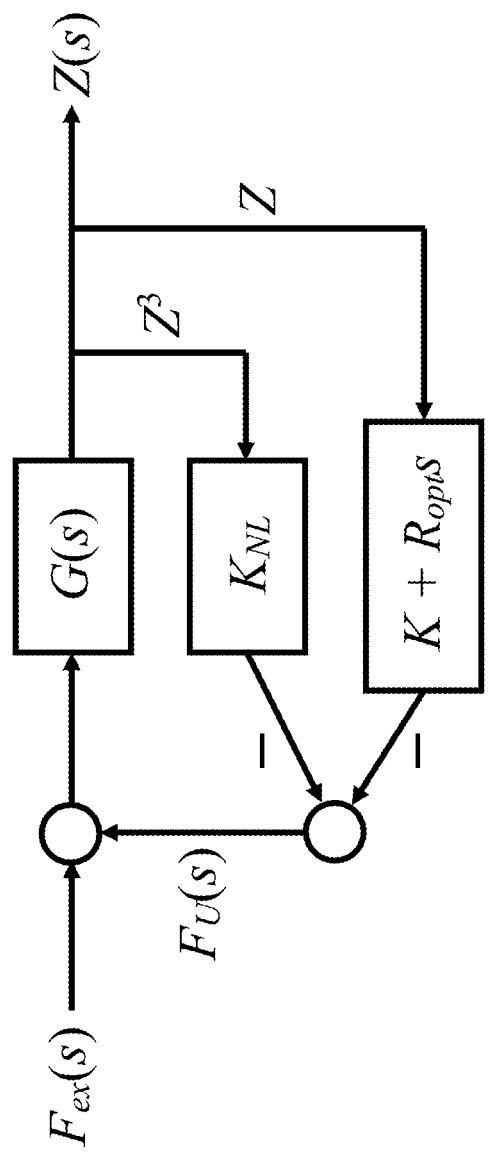
FIG. 3 is a block diagram of a NL controller.

The feedback control force for the nonlinear cubic spring controller is given by $$F_u = -R_{opt}\dot{z} - K_{NL}z^3 - Kz \quad (18)$$

where for a given sea state $R_{opt}$ is the optimized resistive feedback gain, $K_{NL}$ is the nonlinear spring feedback gain, and K is the linear spring feedback gain, respectively. $K_{NL}z^3$ is a cubic nonlinearity term, where $K_{NL} > 0$ for a hardening or stiffening spring. In FIG. 3 is shown a block diagram of a NL controller.

An optimization algorithm, such as sequential or recursive quadratic programming, can be employed to determine the maximum power absorbed with respect to a typical cost function, such as $$J = \int_0^{\tau_1} f \cdot \dot{z} \, d\tau = \int_0^{\tau_1} -R_{opt}\dot{z}^2 \, d\tau \quad (19)$$

per a given sea state. This can be performed for either PDC3 or NL control designs. In addition, a table look-up gain scheduler can be constructed to adjust between sea-state levels.

Figure 4:
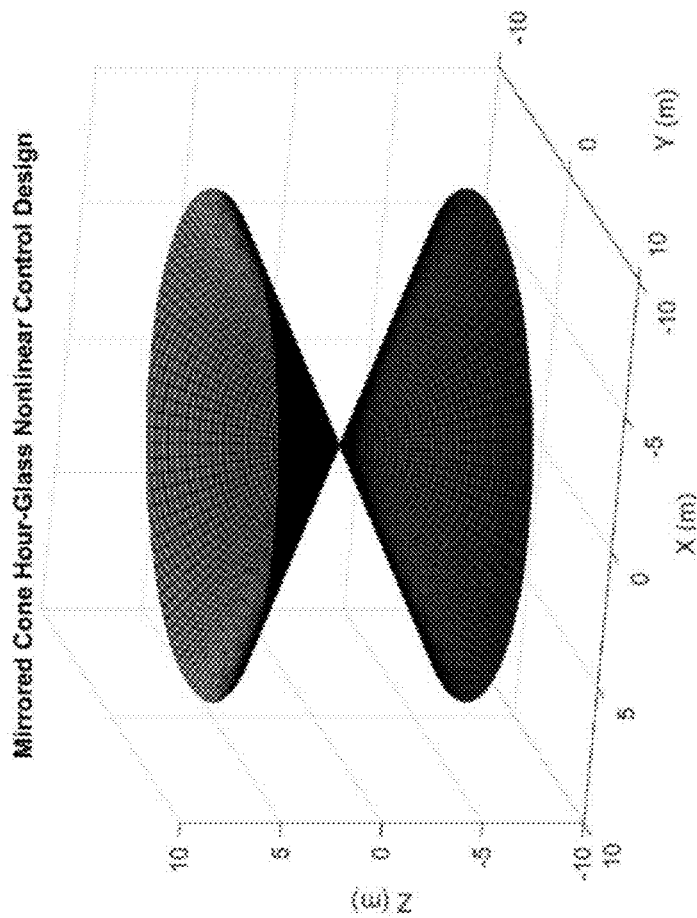
FIG. 4 is a schematic illustration of a geometric reactive power buoy shape comprising an hour-glass mirrored cone that provides a nonlinear hydrostatic force.

As an example, the nonlinear control can be a simple optimized resistive feedback (rate feedback) to maximize the power/energy capture while implementing the reactive power through a mechanical/hydro mechanism, power electronics energy storage system, or buoy geometry modification. For example, the nonlinear control can comprise a mechanical cubic hardening spring in combination with an energy storage device to help transmit reactive power between cycles. Alternatively, the power electronics can be designed to include reactive power realized by a traditional energy storage system, such as a flywheel, capacitor, or battery, to mimic the nonlinear spring effect. Alternatively, a cubic hardening spring effect can be realized by shaping the buoy geometry to produce reactive power from the water. The buoy geometry can provide increasing reactive resistance to water as the buoy moves up or down, away from the neutral buoyancy line or mean water level position. For example, a geometric buoy design that matches a cubic spring effect for the body-wave interaction is shown in FIG. 4. This design comprises an hour-glass mirrored cone that inherently provides a nonlinear hydrostatic force and is relatively easy to implement.

Numerical Simulations

Numerical simulations were performed for the right circular cylinder buoy shown in FIG. 1 for both the linear PDC3 controller and the nonlinear cubic spring controller of the present invention. The goal of PDC3 is to increase power/energy capture for off-resonance conditions. This requires additional filtering, individual frequency tuning, and associated power electronics and energy storage to meet the reactive power requirements. For the nonlinear cubic spring controller, these implementation components for PDC3 can be simplified and still produce equivalent power output. The numerical simulation results described below compare the linear PDC3 output to the NL cubic spring output over a 200 second time window. Two cases are described for each controller, the first case considers a single-frequency wave force input and the second case considers a multi-frequency wave force input. The multi-frequency wave described in the second case closely represents an irregular wave profile popular in investigations in the WEC literature. See J. Hals et al., *J. Offshore Mech. Arct. Eng.* 133(3), 031101 (2011).

Single-Frequency Wave Excitation

Figure 5B:
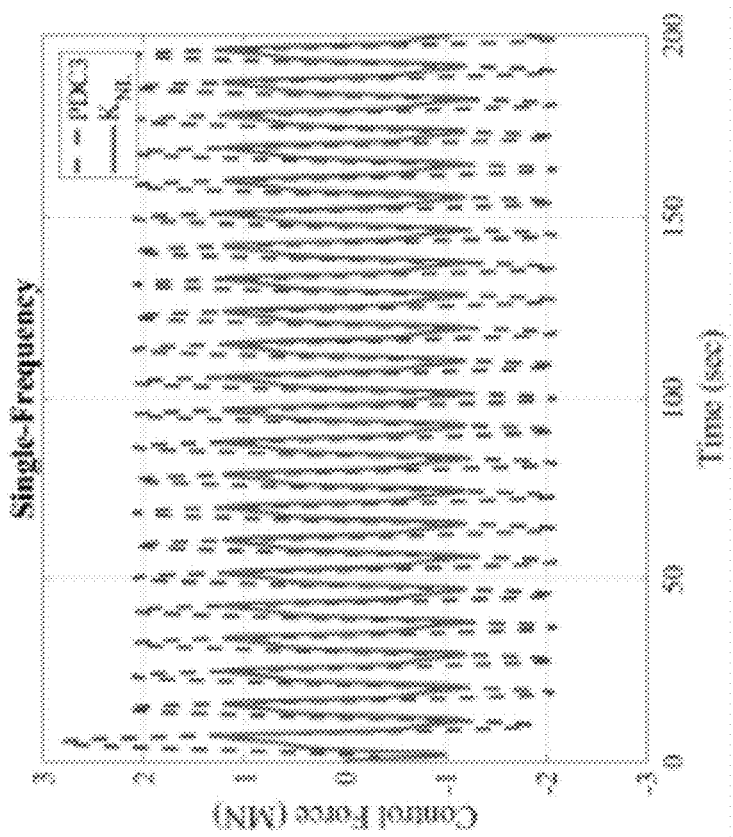
FIG. 5($a$) is a graph of the excitation force for a single frequency wave.
Figure 5A:
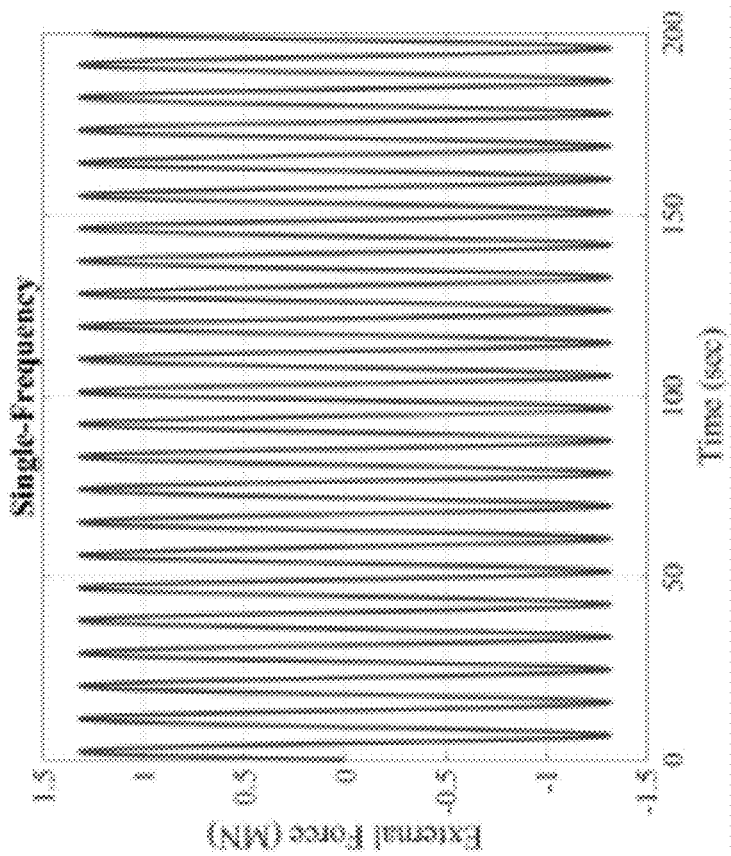
Figure 6A:
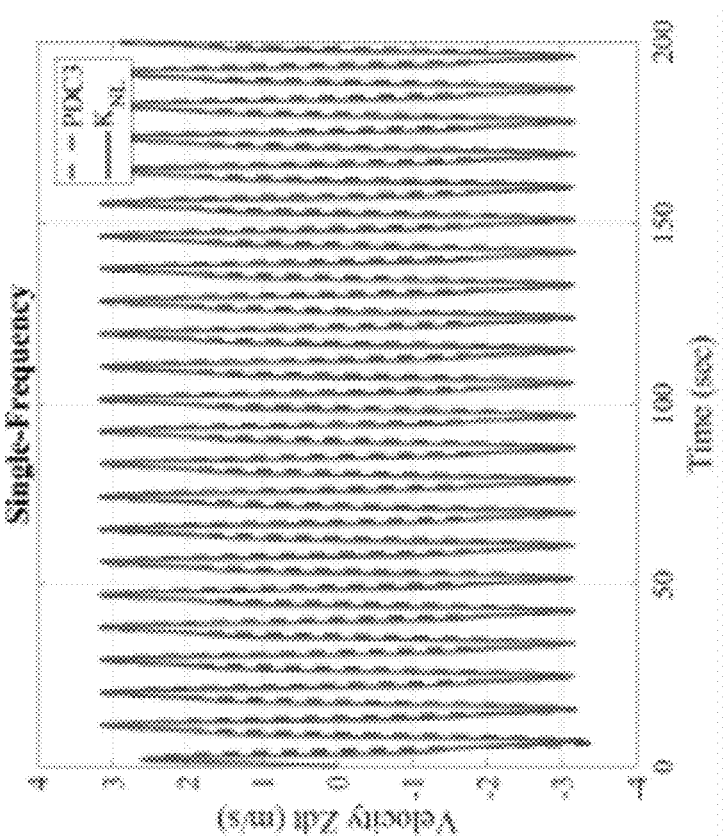
FIG. 6($a$) is a graph of buoy position for both controllers with single frequency wave excitation.
Figure 6B:
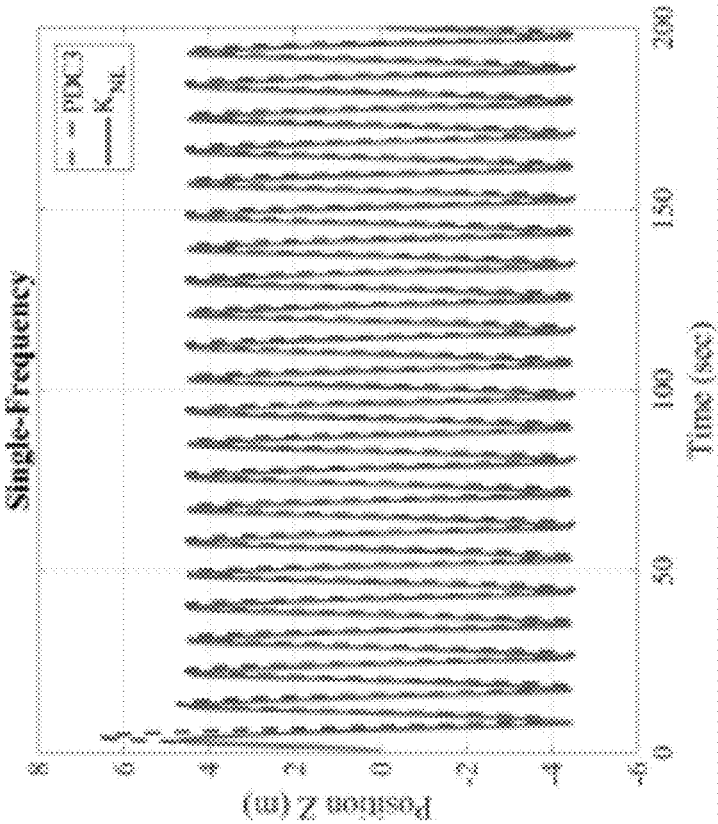
Figure 7B:
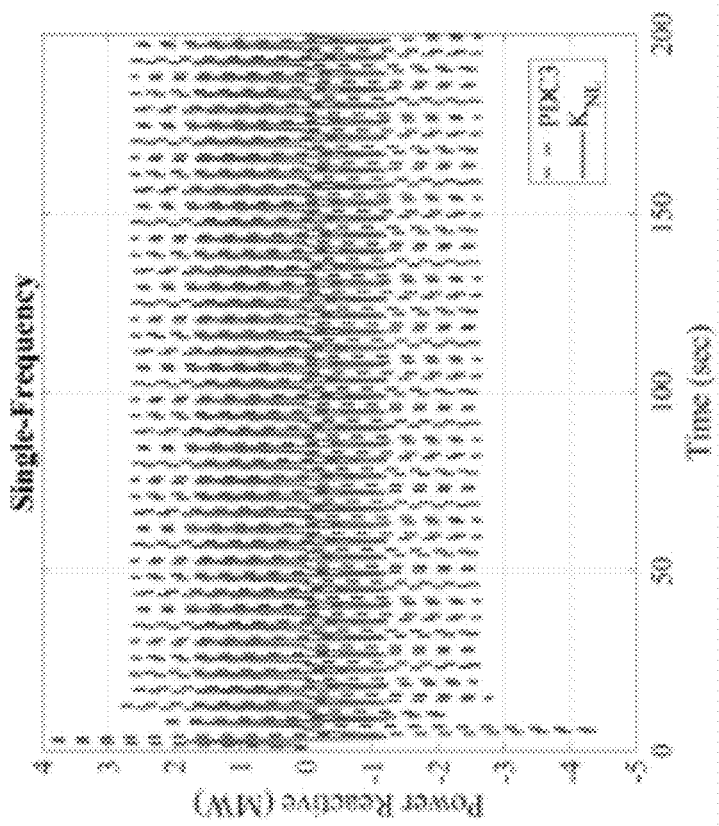
FIG. 7($a$) is a graph of real power for both controllers with single frequency wave excitation.
Figure 7A:
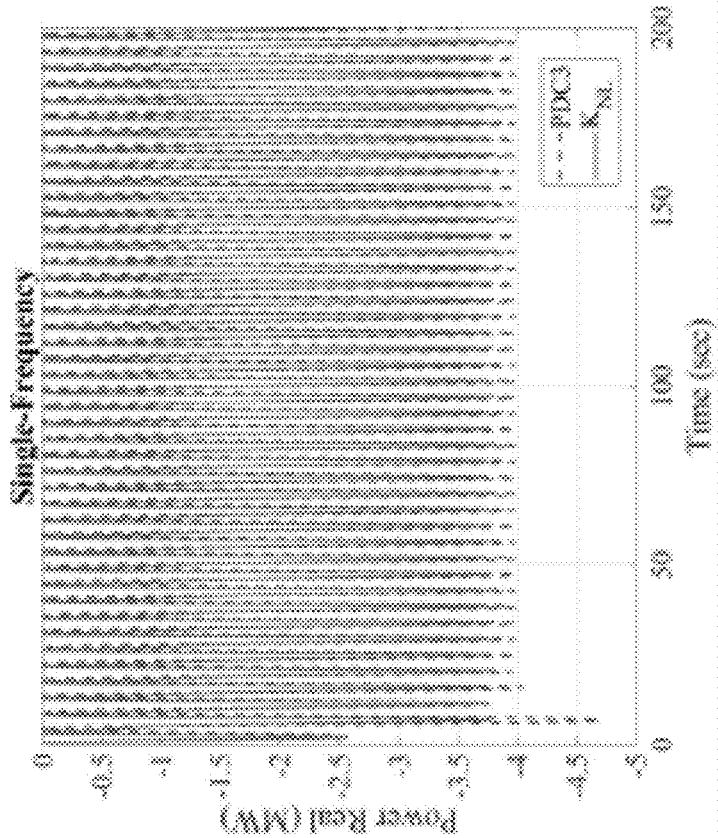
Figure 8:
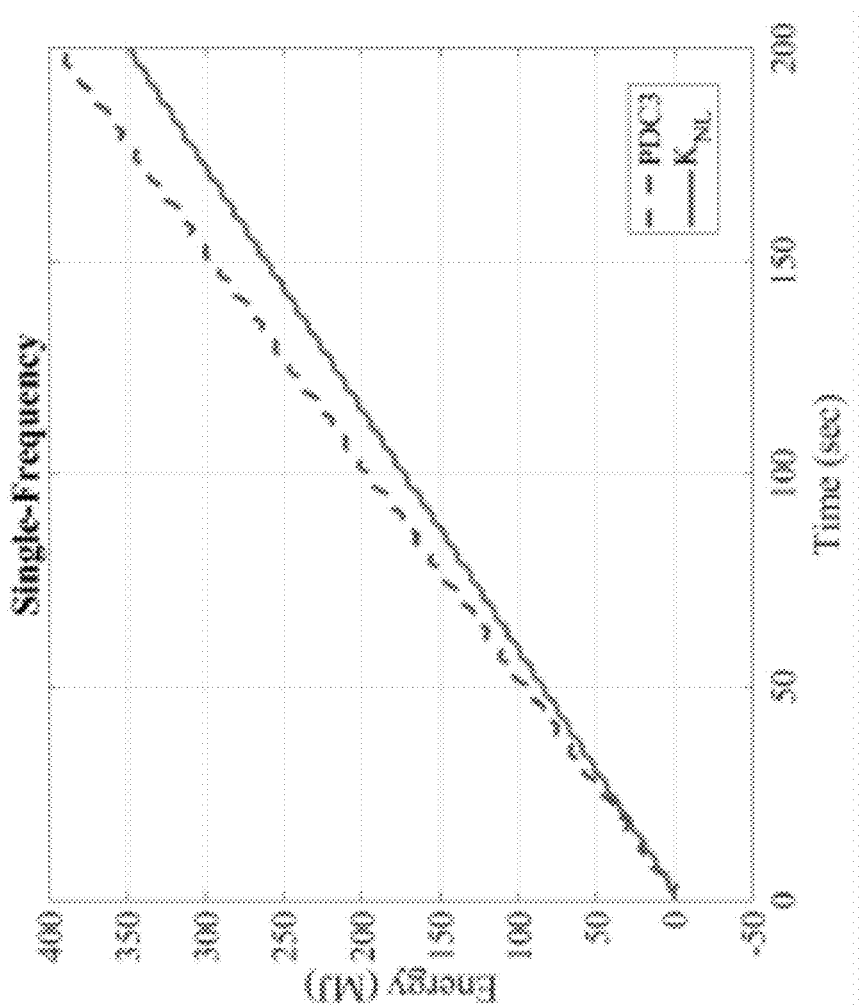
FIG. 8 is a graph of energy for both controllers with single frequency wave excitation.

For the first case, the single-frequency wave force input, with a $F_{amp1} = 1.3199 \times 10^6$ N and $\Omega_{ex1} = 0.6974$ rad/sec is input, as shown in FIG. 5(a). In FIG. 5(b), the control forces are compared for both the PDC3 and NL controllers. In FIGS. 6(a) and 6(b), the buoy positions and velocities are compared for both controllers. The primary constraint for the right circular cylinder buoy is to stay within the maximum draft (i.e., don't jump out of the water or totally submerge) which turns out to be approximately ±4.5 meters. The model simulation parameters, damping for PDC3 and damping and cubic spring stiffness for NL, were adjusted accordingly to stay within the constraints. The corresponding real and reactive power responses are shown in FIGS. 7(a) and 7(b), respectively. These responses initially provide power requirements for the energy storage systems, specifically, the reactive power responses, for which the NL cubic spring is shown in FIG. 7(b) to require less storage. The energy responses for both controllers are shown in FIG. 8.

Multi-Frequency Wave Excitation

Figure 9B:
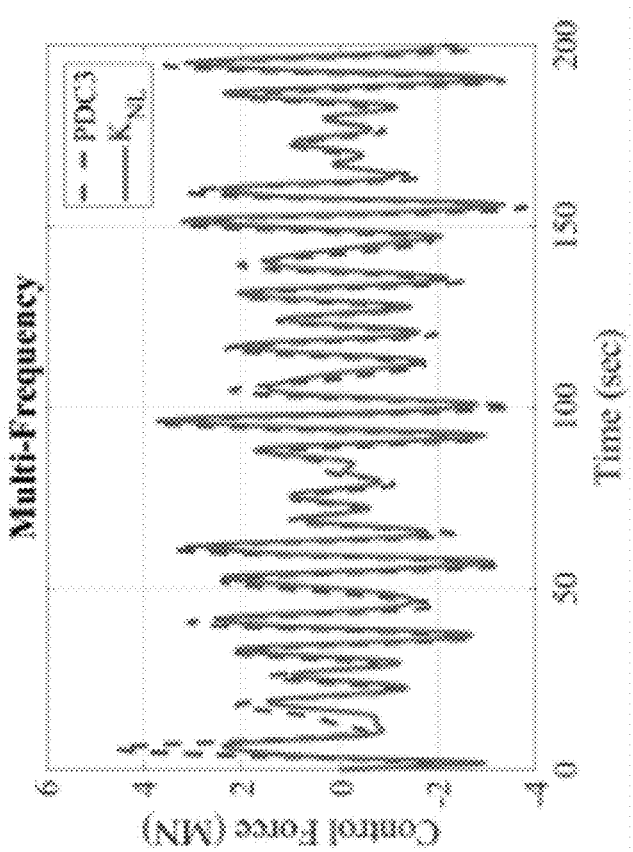
FIG. 9($a$) is a graph of the excitation force for a multi-frequency wave.
Figure 9A:
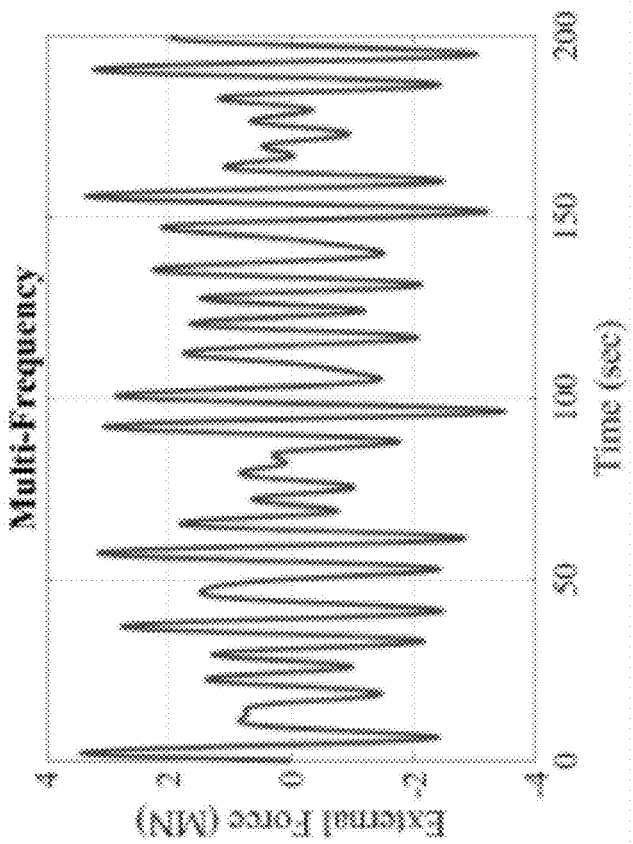
Figure 10B:
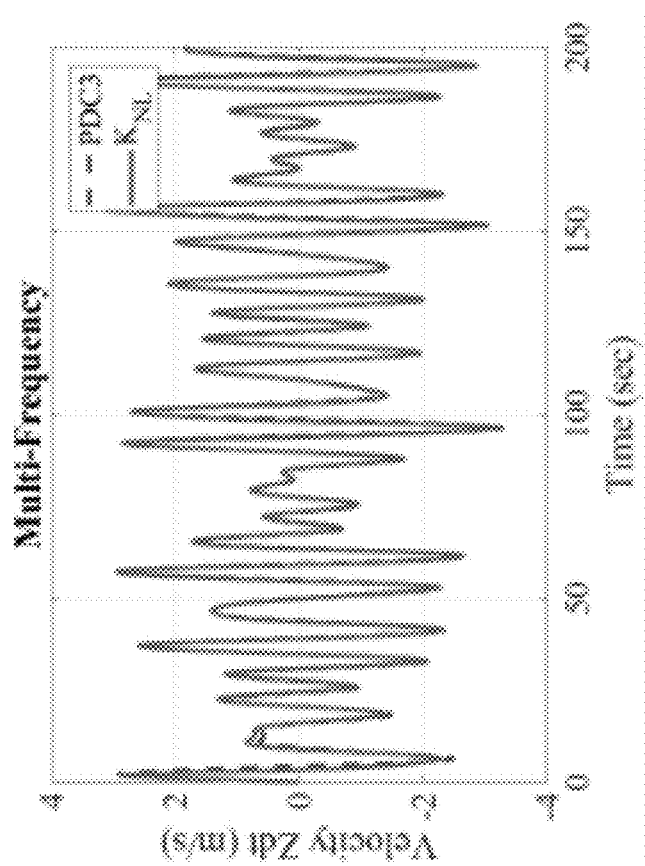
FIG. 10(b) is a graph of buoy velocity for both controllers with multi-frequency wave excitation.
Figure 10A:
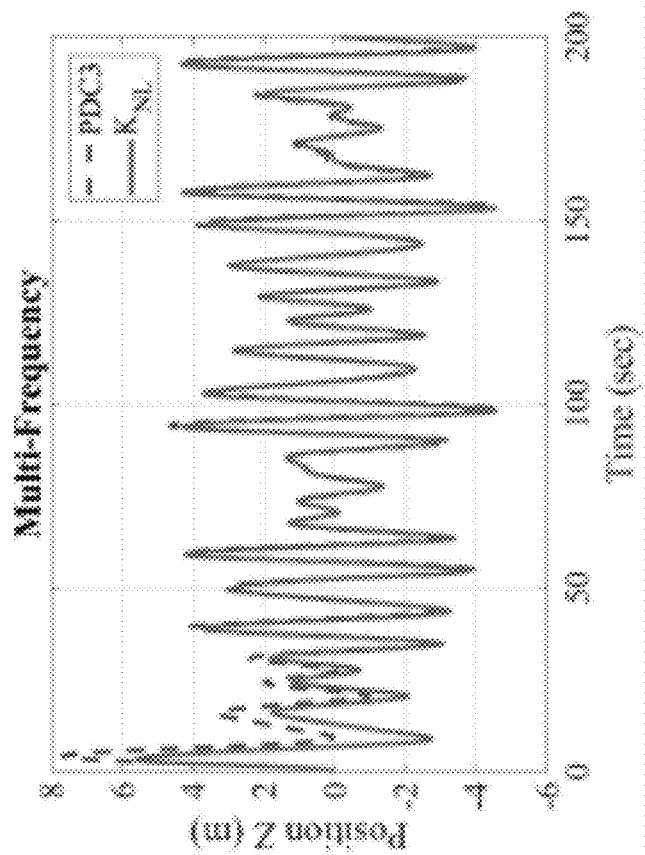
FIG. 10(a) is a graph of buoy position for both controllers with multi-frequency wave excitation.
Figure 11B:
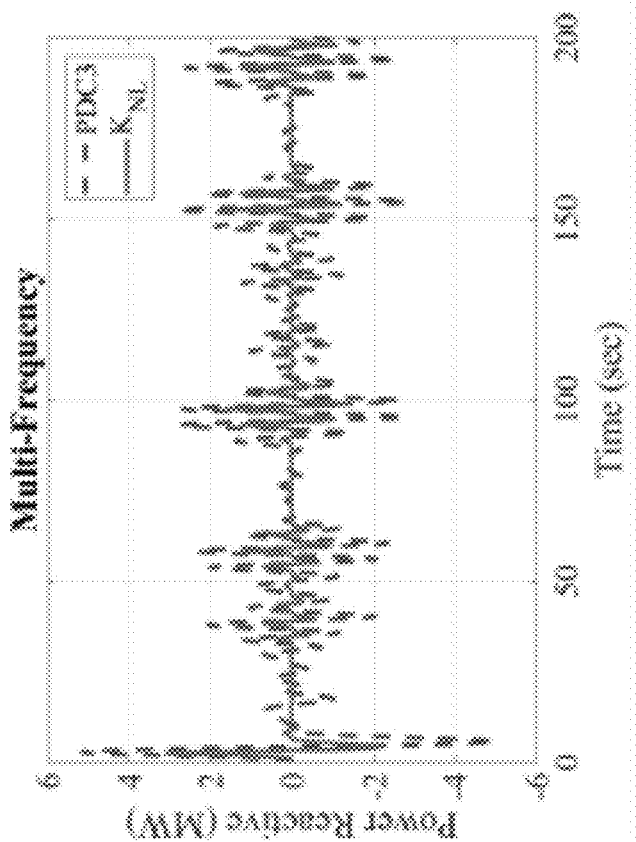
FIG. 11(b) is a graph of reactive power for both controllers with multi-frequency wave excitation.
Figure 11A:
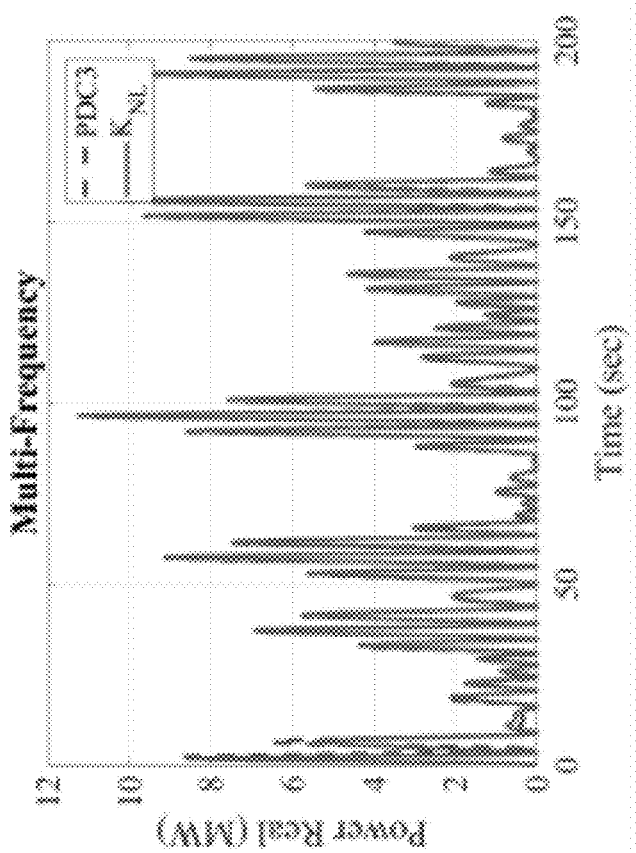
FIG. 11(a) is a graph of real power for both controllers with multi-frequency wave excitation.
Figure 12:
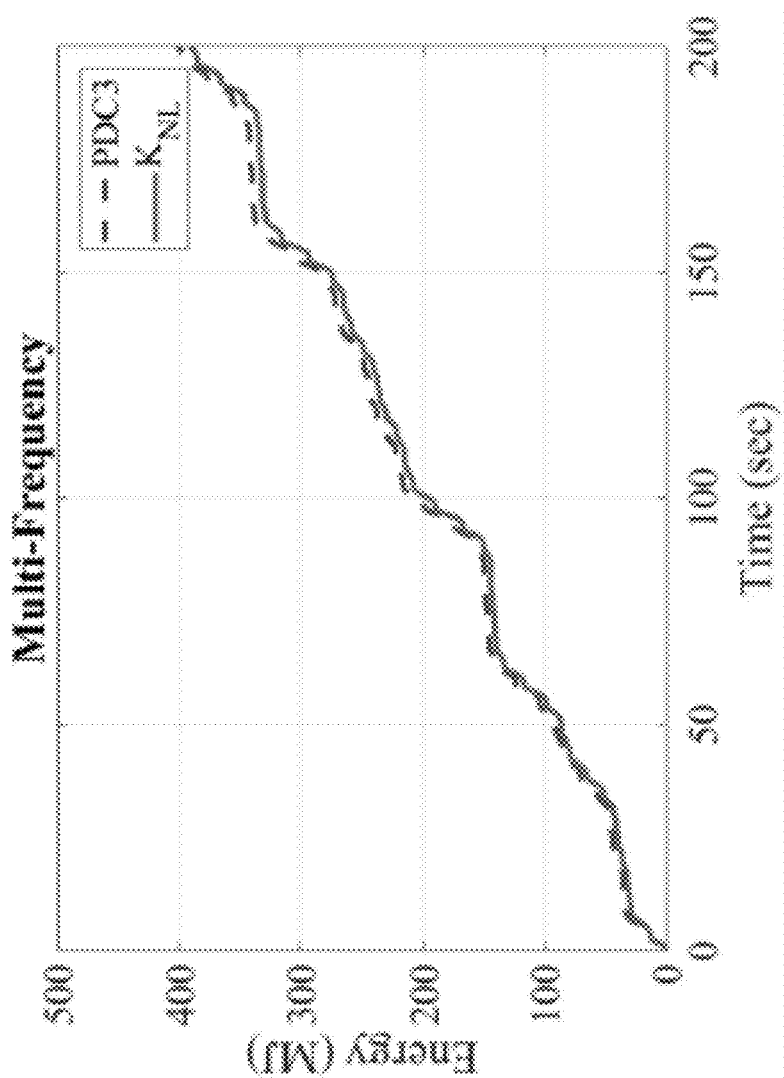
FIG. 12 is a graph of energy for both controllers with multi-frequency wave excitation.

In the second case, a multi-frequency wave force input was employed. The multi-frequency force was composed of the sum of three separate sinusoidal frequencies and magnitudes. The other two additional forces include; $F_{amp2} = 1.18791 \times 10^6$ N and $\Omega_{ex2} = 0.5712$ rad/sec, and $F_{amp3} = 1.05592 \times 10^6$ N and $\Omega_{ex3} = 0.8976$ rad/sec, respectively. The resulting external force is shown in FIG. 9(a). The control forces for both controllers are shown in FIG. 9(b). Observing the same draft or position constraints as the first single-frequency case, the position and velocity responses are shown in FIGS. 10(a) and 10(b). The same simulation parameters were adjusted to stay within the positional constraints. The generated real and reactive power responses are shown in FIGS. 11(a) and 11(b), respectively. As shown in FIG. 11(b), the NL reactive power response for the multi-frequency case shows a reduction in required reactive power for the energy storage system, as was observed in the single-frequency case. The corresponding energy responses for both controllers with the multi-frequency excitation are shown in FIG. 12. The energy responses are very similar and close to the same amount for both multi-frequency controllers.

Hamiltonian Surface Shaping Single-Frequency Excitation

A Hamiltonian surface defines the accessible phase space of the system. The dynamical system path/trajectory traverses the energy storage surface defined by the Hamiltonian because of the power flow. The Hamiltonian or stored energy for PDC3 controller is defined as $$\mathcal{H} = \mathcal{T} + V = \frac{1}{2}M\dot{z}^2 + \frac{1}{2}(k + K_P)z^2. \quad (20)$$

The Hamiltonian for the NL cubic spring controller is defined as $$\mathcal{H} = \mathcal{T} + V = \frac{1}{2}M\dot{z}^2 + \frac{1}{4}K_{NL}z^4. \quad (21)$$

Figure 13B:
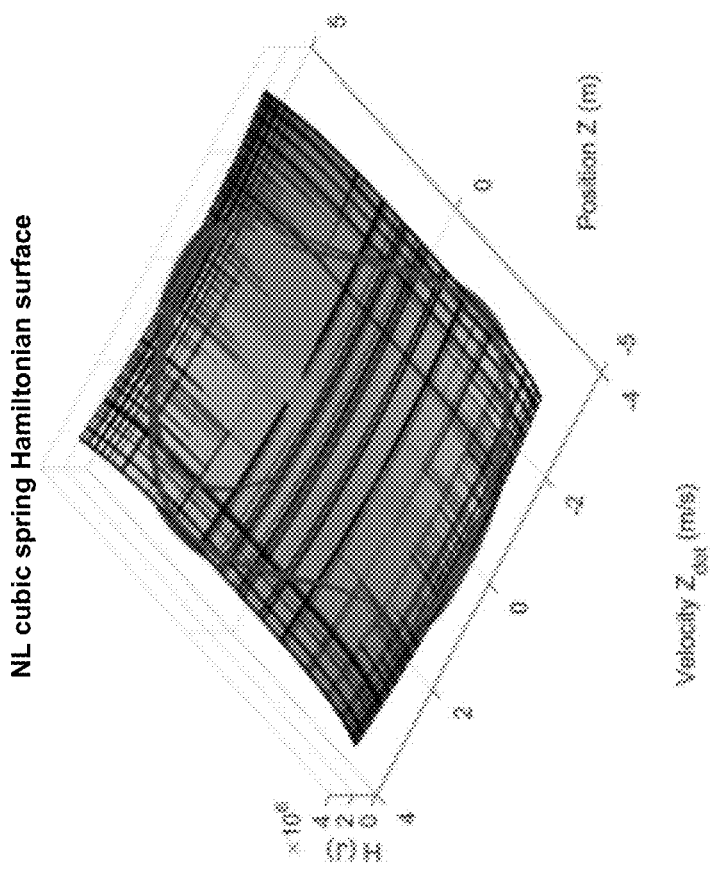
FIG. 13(b) is a graph of the Hamiltonian surface for the cubic spring controller.
Figure 13A:
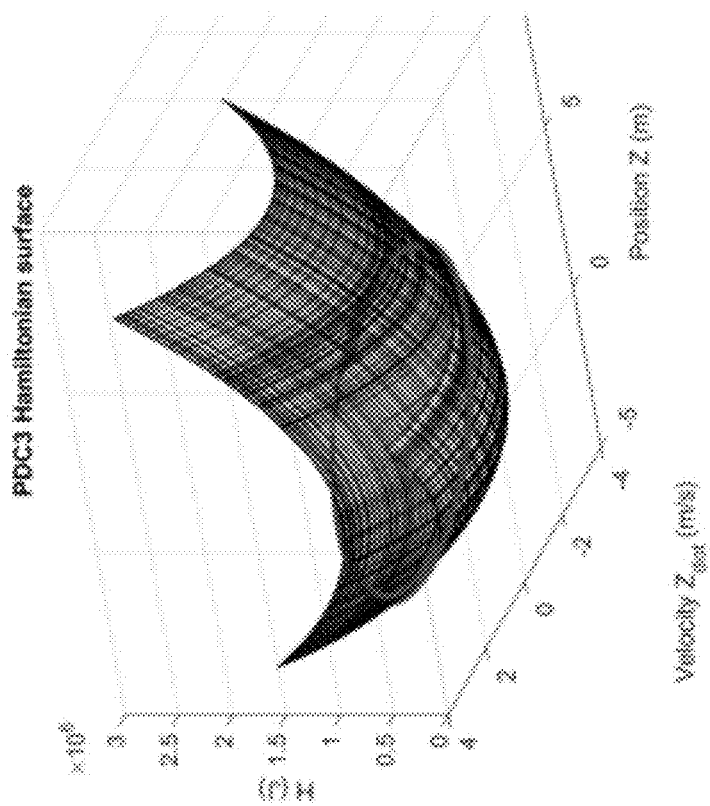
FIG. 13(a) is a graph of the Hamiltonian surface for the PDC3 controller.

The profiles for each controller are shown in FIGS. 13(a) and 13(b). A limit cycle behavior is observed, where the goal for PDC3 is to resonate the WEC in off-resonance conditions. The trajectory demonstrates a tuned response or, for electrical systems, a power factor of one. For the NL hardening spring case shown in FIG. 13(b), the limit cycle surface contour and shape are changed due to the potential energy provided by the NL cubic spring, generating a nonlinear resonance. The limit cycle is similar in response to a Duffing oscillator response. See R. Robinett and D. Wilson, *Nonlinear Power Flow Control Design: Utilizing Exergy, Entropy, Static and Dynamic Stability, and Lyapunov Analysis*, Springer Verlag London Limited, 2011.

The present invention has been described as a nonlinear controller for nonlinear wave energy converters. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nonlinear wave energy converter, comprising:
    a buoy in a body of water having a wave motion, wherein the waves impacting the buoy exert an excitation force with a plurality of excitation frequencies that causes a buoy motion in a heave direction relative to a reference,
    an actuator that is configured to apply a control force in the heave direction to the buoy, and
    a nonlinear feedback controller that computes the control force to be applied by the actuator, wherein the controller comprises a feedback loop comprising a nonlinear cubic spring.

2. The nonlinear wave energy converter of claim 1, wherein the nonlinear cubic spring comprises a mechanical cubic hardening spring.

3. The nonlinear wave energy converter of claim 1, wherein the nonlinear cubic spring comprises power electronics that control an energy storage system to match a nonlinear spring effect.

4. The nonlinear wave energy converter of claim 3, wherein the energy storage system comprises a flywheel, capacitor, or battery.

5. The nonlinear wave energy converter of claim 1, wherein the nonlinear cubic spring comprises shaping the buoy geometry to produce reactive power from the water.

6. The nonlinear wave energy converter of claim 5, wherein the buoy comprises as hour-glass mirrored cone.

* * * * *